May 16, 1939.　　　　　C. C. HARRAH　　　　　2,158,796
MANUFACTURE OF TUBING
Filed Jan. 21, 1935　　　　3 Sheets-Sheet 3
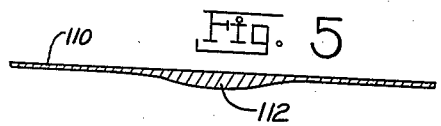
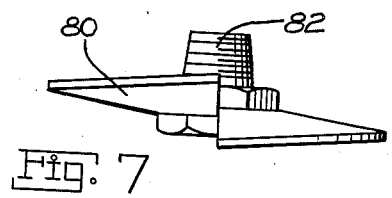
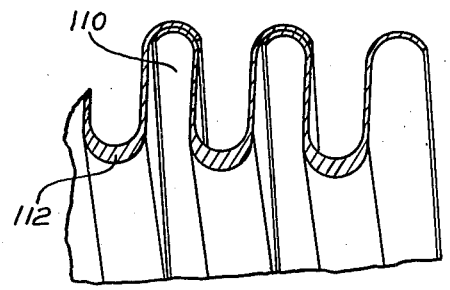
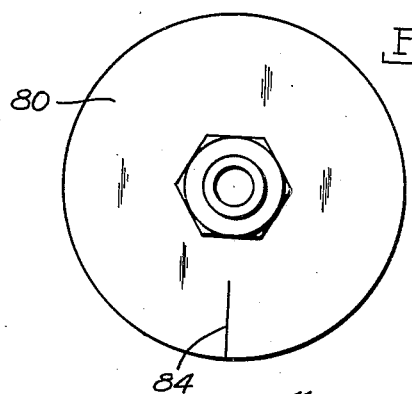
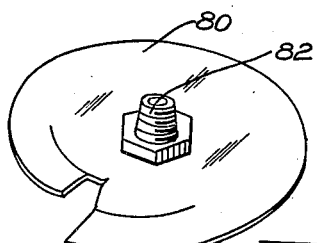
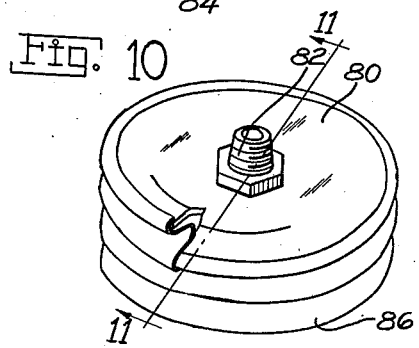
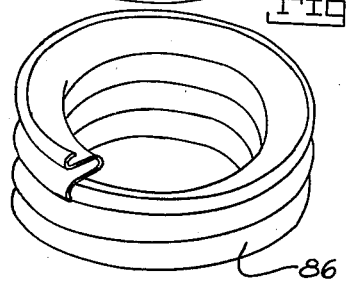
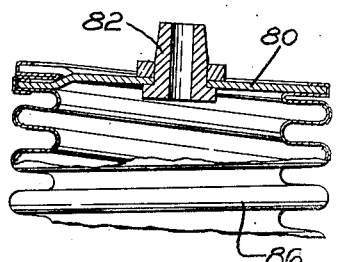
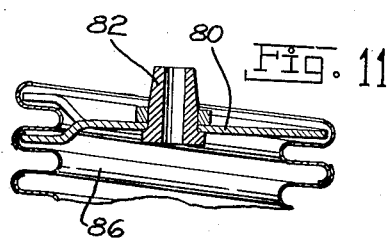
INVENTOR.
CLAYTON C. HARRAH
BY
Jn. W. McConkey
ATTORNEY.

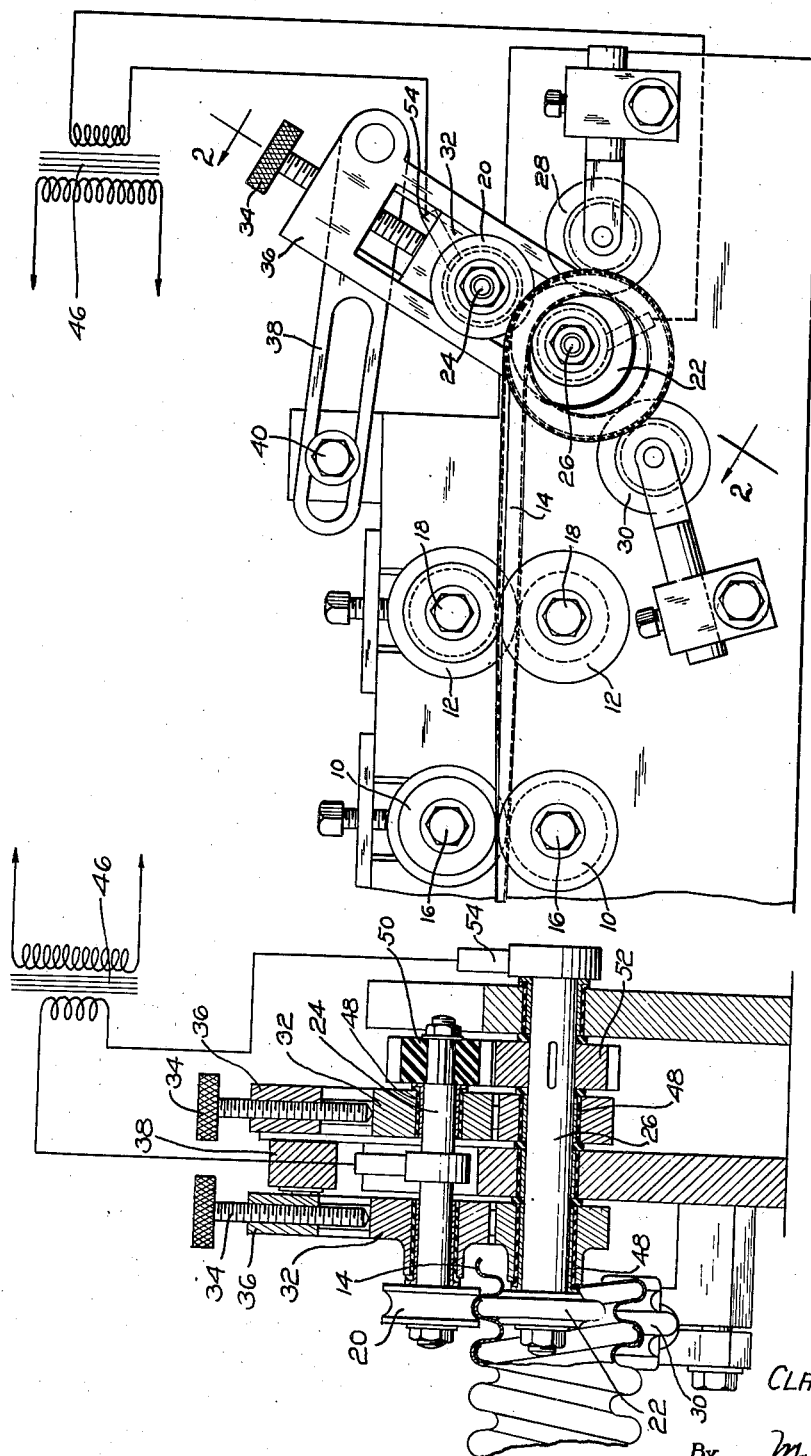

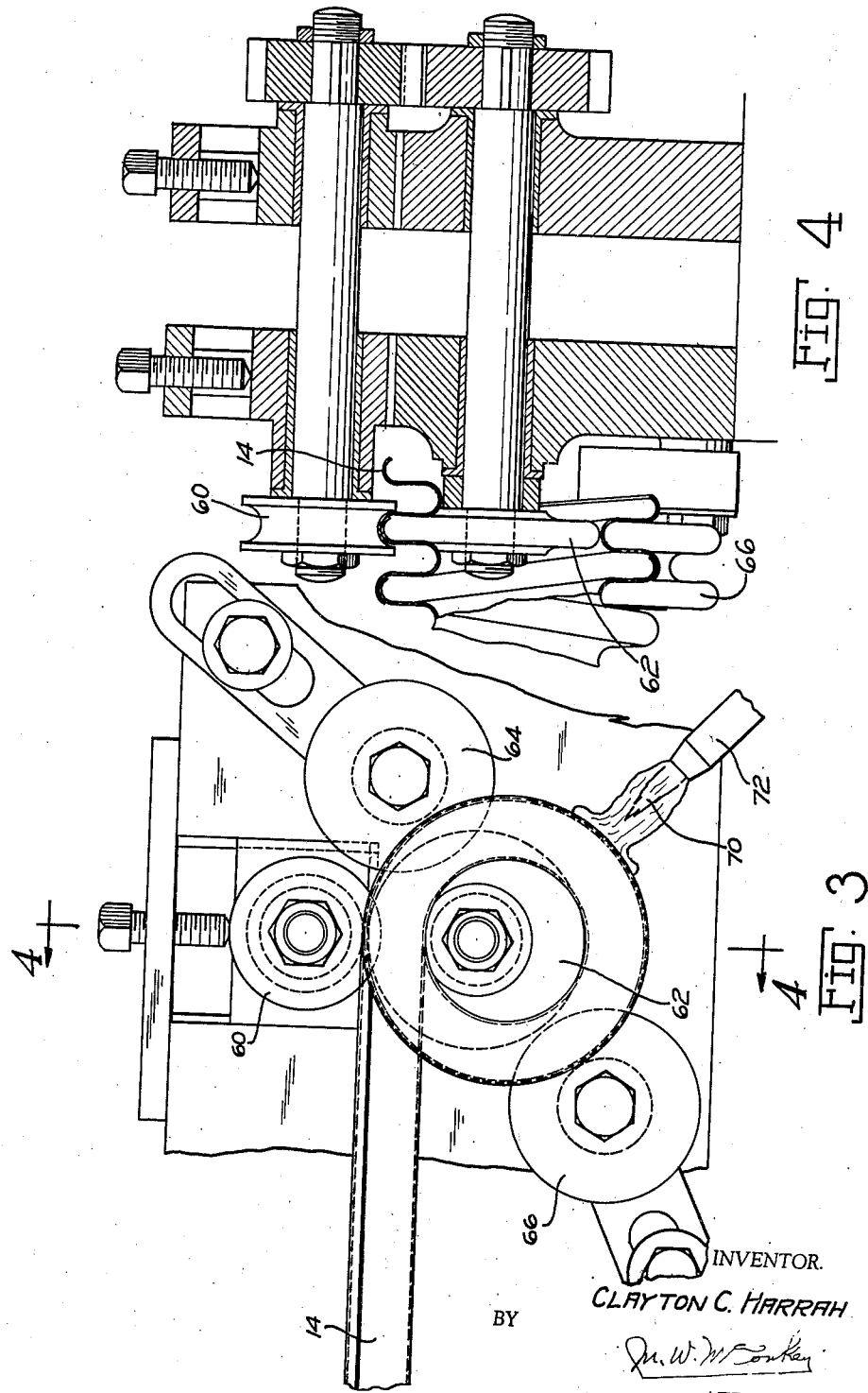

Patented May 16, 1939

2,158,796

UNITED STATES PATENT OFFICE 2,158,796

MANUFACTURE OF TUBING

Clayton C. Harrah, Niles, Mich., assignor to National Standard Company, Niles, Mich., a corporation of Michigan Application January 21, 1935, Serial No. 2,647

1 Claim. (Cl. 113—35)

This invention relates to the manufacture of corrugated flexible metal tubing, such as is used in making metal bellows and the like, and to the making of such bellows from sections of the tubing.

An important phase of the invention relates to making a permanent and continuous bond or joint between the overlapping margins of adjacent convolutions, while the margins are held together as the tubing is made. That is, a bonding material (such as copper, brass, tin, or the like) between the overlapping margins is heated sufficiently to melt it and cause it to penetrate metal of the strip being wound up to form the tubing, to make the desired joint, while the overlapping margins are compressed between a pair of pressure rollers or the equivalent, or immediately thereafter. I prefer to arrange the rolls to stretch the metal of the overlapping margins circumferentially about the inner roll, to insure a tight joint.

While many of the advantages of the invention can be secured by a flame directed against the overlapping margins just beyond the pressure rollers, I believe the best results are secured by resistance heating caused by passing an electric current through the overlapping margins and through the bonding material (which is preferably plated upon the steel or brass strip from which the tubing is formed).

To this end, I prefer to arrange an electric current of considerable amperage between the pressure rolls, through the overlapping margins between them, and various features of the invention relate to the arrangements necessary for this purpose.

Other features of the invention relate to the use of a strip which is formed to limit the flexibility of one portion of the corrugation, to a novel and simple and effective means for mounting and securing in place an end plate to make a metal bellows, and to other novel combinations of parts and desirable particular constructions, which will be apparent from the following description of the illustrative constructions and arrangements shown in the accompanying drawings, in which:

Figure 1 is a side elevation of part of a preferred form of apparatus, in which electric heating is employed;

Figure 2 is a transverse section through the pressure rolls, on the line 2—2 of Figure 1;

Figure 3 is a partial side elevation of an alternative apparatus, in which gas heating is employed;

Figure 4 is a section, on the line 4—4 of Figure 3, through the pressure rolls;

Figure 5 is a section, on an enlarged scale, through a strip used in making the tubing, and which is so formed as to limit the flexibility of one part of the corrugations;

Figure 6 is a partial section through a section of tubing made from the strip of Figure 5;

Figure 7 is an elevation of an end plate used in making a metal bellows;

Figure 8 is a plan view of the plate;

Figure 9 is a perspective of the plate and a tubing section, before assembly;

Figure 10 is a perspective of the assembled bellows;

Figure 11 is a section on line 11—11 of Figure 10 showing the plate just threaded into the end convolution of the tubing section; and Figure 12 is a section showing the end convolution compressed upon the peripheral zone of the plate.

The apparatus shown in Figures 1, 2, 3, and 4, except for the heating means described below, is fully described, and is claimed, in application No. 695,270, filed October 26, 1933, by Hale W. Parrish and Lawrence G. Dickeson.

The apparatus of Figures 1 and 2 includes a series of forming rolls 10, 12, etc., gradually rolling a central corrugation into a strip 14 of steel or hard brass or other metal, which preferably is plated with copper, soft brass, or other bonding material. These rolls are mounted on parallel shafts 16, 18, etc., driven as described in the above-mentioned Parrish and Dickeson application, and preferably with the upper rolls spring-pressed as described in said application.

The corrugation having been formed by the rolls 10 and 12, the strip passes to a pair of driven pressure rolls 20 and 22, carried respectively by parallel shafts 24 and 26, which (with the aid of adjustable guide rolls 28 and 30) wind the corrugated strip helically into a tubing, with the margins of adjacent convolutions overlapping as shown in Figure 2.

The upper roll 20 and its shaft 24 are carried in slidable blocks or the like 32, held by adjustable pressure screws 34, in swinging arms 36 which are adjustable angularly about the axis of shaft 26, and which are held by one or more slotted links 38 secured in adjusted position by clamp screws 40 threaded into the machine frame.

By adjusting arms 36 to different angles, upper roll 20 stretches and compresses the overlapping margins different distances around and upon the lower roll or mandrel 22, thereby determining the diameter of the finished tubing as shown in Figure 1. Rolls 28 and 30 are adjusted in accordance with this diameter.

According to an important feature of this invention, the overlapping margins (while so compressed and stretched, or at least immediately beyond the pressure rolls) are heated to melt the bonding material and form a continuous and permanent joint, while at the same time softening the metal of the strip to facilitate forming a close joint, and annealing the metal to take out the strains caused by forming and stretching it.

In the arrangement of Figures 1 and 2, this is done by resistance heating, a considerable electric current is passed between the rolls 20 and 22, through said overlapping margins. As shown, the two leads from the secondary of a transformer 46 are connected respectively to the shafts 24 and 26.

The shaft bearings are seated in insulating material 48 (Figure 2), and one of the two intermeshing gears 50 and 52 on the shafts is either made of fiber or other insulating material, as shown, or (if made of steel) is insulated from its shaft in any desired manner. The current is shown led to the shafts through brushes 54.

In the arrangement of Figures 3 and 4, the corrugated strip is led tangentially between pressure rolls 60 and 62, which cooperate with an adjustable bending roll 64 and an adjustable guide roll 66 to wind the strip helically as desired. In this case there is no substantial stretching of the metal upon and about the lower roll 62 or mandrel, pressure being relied upon to form a close joint.

In this arrangement, I have illustrated the forming of the joint by the flame 70 of a burner 72, adjacent the pressure rolls 60 and 62 and preferably between the rolls 64 and 66.

When the tubing, made as described above, is to be used to make a metal bellows, it is sometimes desirable to restrict the bending to a particular part of the walls of the corrugation. The overlapping margins, of course, are substantially inflexible as compared to the remainder of the corrugations, and may be arranged as shown in Figure 6 at the outer bends of the corrugations.

I may then use, as a material to start with, a metal strip 110 (plated as previously described with bonding material) having a thick and relatively inflexible central zone 112 which, in the finished tubing, forms the inner bends of the corrugations. This restricts the bending to the side walls of the corrugations, as is desirable in some forms of metal bellows.

Figures 7 to 12 illustrate a preferred manner of securing an end plate to such a bellows. The plate may be a flat circular stamping 80, of steel or brass or other metal, plated with copper or brass or other bonding material, provided if desired with any suitable end fitting 82.

This plate is formed with a radial slit 84 (Figure 8) extending inwardly from its peripheral edge, and the material on opposite sides of this slit is displaced in opposite directions crosswise of the plane of the plate, to form the peripheral edge on a pitch equal to that of the helical corrugation of the tubing section, as shown in Figures 7 and 9.

This end plate is then threaded into the end convolution of a section 86 of the above-described tubing, as shown in Figures 9, 10, and 11. The corrugation is, if desired, then compressed upon the peripheral zone of the end plate as shown in Figure 12, and this compressed zone is then heated in any desired manner to form a permanent joint or bond between the end plate and the end convolution of the tubing section 86. The bellows, as so completed, is shown in Figure 12.

While various constructions and arrangements have been described in detail, it is not my intention to limit the scope of my invention by that description, or otherwise than by the terms of the appended claim.

I claim:

That method of making corrugated tubing which comprises winding a longitudinally corrugated strip helically with the margins of adjacent convolutions overlapping each other and with bonding material between said overlapping margins and, in the winding operation, stretching the metal of said overlapping margins to provide a close joint and compressing said margins, and heating the overlapping margins substantially at the same time as the stretching and while said margins are under compression due to said winding operation to cause said bonding material to form a continuous permanent joint between said margins.

CLAYTON C. HARRAH.